United States Patent [19]
Carlson

[11] 3,737,028
[45] June 5, 1973

[54] PACKAGED ADHESIVE LAMINATE AND METHOD OF MAKING THE SAME

[75] Inventor: Russell L. Carlson, Tallmadge, Ohio

[73] Assignee: Morgan Adhesives Company, Stow, Ohio

[22] Filed: Apr. 8, 1971

[21] Appl. No.: 132,437

[52] U.S. Cl. ............206/52 R, 53/13, 206/59 R, 220/97 R
[51] Int. Cl. .............................................B65d 85/67
[58] Field of Search .................206/59 E, 59 F, 59 R, 206/59 C, 59 A, 59 B, 52 R, 52 F, 46 R, 46 Z, 46 Y; 220/97 R, 4 R; 229/48 T; 53/13

[56] References Cited
UNITED STATES PATENTS

| | | | |
|---|---|---|---|
| 3,234,024 | 2/1966 | Leinonen | 206/59 E |
| 2,834,507 | 5/1958 | Metzler et al | 220/97 R |
| 2,822,952 | 2/1958 | Scott | 220/97 R |
| 2,510,727 | 6/1950 | Sussenbach | 229/48 T |
| 2,094,454 | 9/1937 | Keville | 206/59 C |
| 2,883,045 | 4/1959 | Abramson | 106/59 F |
| 3,070,257 | 12/1962 | Bojanowski | 220/97 R |
| 3,322,262 | 5/1967 | Puente | 220/97 R |

Primary Examiner—William T. Dixson, Jr.
Attorney—Oldham & Oldham

[57] ABSTRACT

A packaged adhesive laminate is formed by rolling up a laminate adhesive sheet or other material on a cylindrical core, securing a sheet of heat sealable material to the end of the laminate sheet and wrapping the heat sealable sheet around the rooled up laminate, cutting the rolls of material into individual rolls, positioning plastic end caps on each side of the individual rolls, and heat sealing the end caps to the heat sealable material. The end caps have lip portions which overlie the heat sealable wrapping. The invention also concerns a novel method fopackaging adhesive laminates or the like.

10 Claims, 6 Drawing Figures

Patented June 5, 1973  3,737,028

INVENTOR.
RUSSELL L. CARLSON
BY Oldham & Oldham
ATTORNEYS

PACKAGED ADHESIVE LAMINATE AND METHOD OF MAKING THE SAME

The present invention is concerned with a method for packaging adhesive laminate in roll form and with the article formed thereby.

Rolls of laminated adhesive sheet and/or tape are normally provided with protective covers or packaging of some type to protect the laminated adhesive sheet from dirt and other contaminates, or from damage in transit, and to prolong the shelf life of the adhesive sheet. Present packaging arrangements, however, are unduly bulky, adding considerably to the volume of the laminated adhesive roll. This bulkiness is wasteful of shipping and storage space as well as of packaging material.

Among the primary objects of the present invention are the provision of a compact, damage resistant packaging arrangement for rolls of sheet material and a method of forming the packaged rolls.

It is also an object of the invention to provide a packaging arrangement for adhesive laminate rolls or rolls of other material which protects the adhesive laminate or sheet from contamination and which provides a waterproof covering for the packaged material.

A further object of the invention is the provision of a method of packaging rolls of adhesive laminate which is characterized by its efficiency, by the convenience of use of the method, and by the positive packaging action obtained.

Another object of the invention is the provision of a package for adhesive laminates which is characterized by its economical use of packaging materials and by the small increase in the volume of the packaged article for efficient shipping thereof in a protected condition.

The above and other objects of the invention which will become apparent in the following detailed description are achieved by providing a packaging for rolls of material such as adhesive laminates which consist of a heat sealable film or sheet surrounding the circumference of the adhesive laminate roll and plastic end caps covering the sides of the rolls. The end caps are provided with lips which overlie the heat sealable material and which are heat sealed thereto. The invention also provides a method for applying such packaging to adhesive laminate rolls which consists of securing a heat sealable sheet to the trailing end of the adhesive laminate, wrapping the heat sealable sheet around the laminate roll to form a cover therefor, cutting the roll diametrically to form individual rolls, positioning molded plastic end caps on each end of the individual rolls, and heat sealing the end caps to the heat sealable wrapping.

For a more complete understanding of the invention and of the objects and advantages thereof, reference should be had to the following detailed description and the accompanying drawing wherein there is shown a preferred embodiment of the invention.

The adhesive laminate referred to herein may be any form of adhesive laminate in sheet or strip form and consists of at least an adhesive layer and a backing sheet or strip. Depending upon the particular type of adhesive and the intended end use of the laminate, additional layers may also be provided, such as release and cover layers. However, the invention is not limited to any particular type of adhesive laminate or combination of layers. Also, the method taught by the present invention and the package formed thereby may be used with materials in sheet, strip, or tape form other than adhesive laminates.

Figure 1:
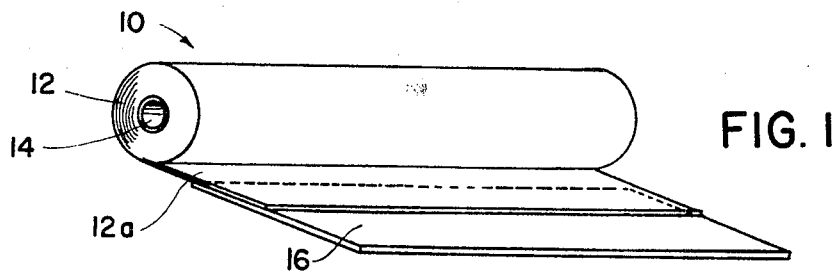
FIG. 1 is an isometric view showing a strip of heat sealable material affixed to the end of the adhesive laminate prior to wrapping the heat sealable material around the laminate roll.

As will be seen from FIG. 1, the adhesive laminate or other sheet material is formed into a roll 10 in the conventional manner. Thus, the adhesive laminate sheet 12 is rolled onto a cylindrical core 14. The core 14 may be cardboard, wood, plastic, or other material of any desired diameter.

In order to form the package or protective cover for the adhesive laminate roll, a sheet of a heat sealable material 16 is suitably attached to the outer or trailing end 12a of the adhesive laminate, the adhesive serving to bond the heat sealable sheet 16 to the laminate sheet 12. When the material being packaged is other than an adhesive laminate, other means may be employed to attach the end of the heat sealable wrapping to the trailing end of the material. It should be noted that the thicknesses of the laminate 12 and the heat sealable sheet 16 have been exaggerated in the drawings for clarity. The heat sealable sheet 16 is of sufficient length to form at least one wrapping around the circumference of the roll 10. The sheet 16 may be of greater length to provide additional wrappings around the roll 10, if desired. Among the suitable materials for the heat sealable sheets 16 are 8 to 10 mil polyethylene sheet, heavy kraft paper with a polyethylene outer layer, or any other heat sealable material. When the heat sealable sheet 16 has been fully wrapped around the roll 10, the roll is cut diametrically, as indicated at 18, to form individual sections or rolls of the desired width. Since the material 16 covered the entire cylindrical surface of the roll 10, each of the individual rolls 20 will also have its entire circumferential surface covered with one or more layers of the heat sealable material 16.

Figure 2:
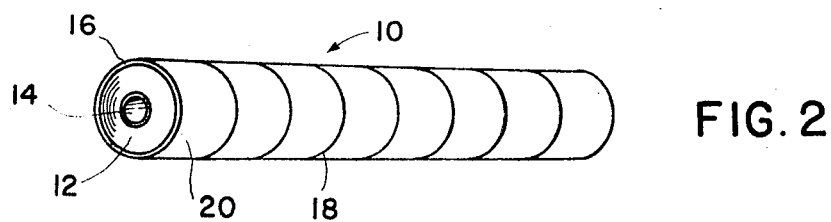
FIG. 2 is an isometric view showing the heat sealable material rolled around the adhesive laminate roll but prior to the slitting of the roll into individual sections or rolls.
Figures 3, 4:
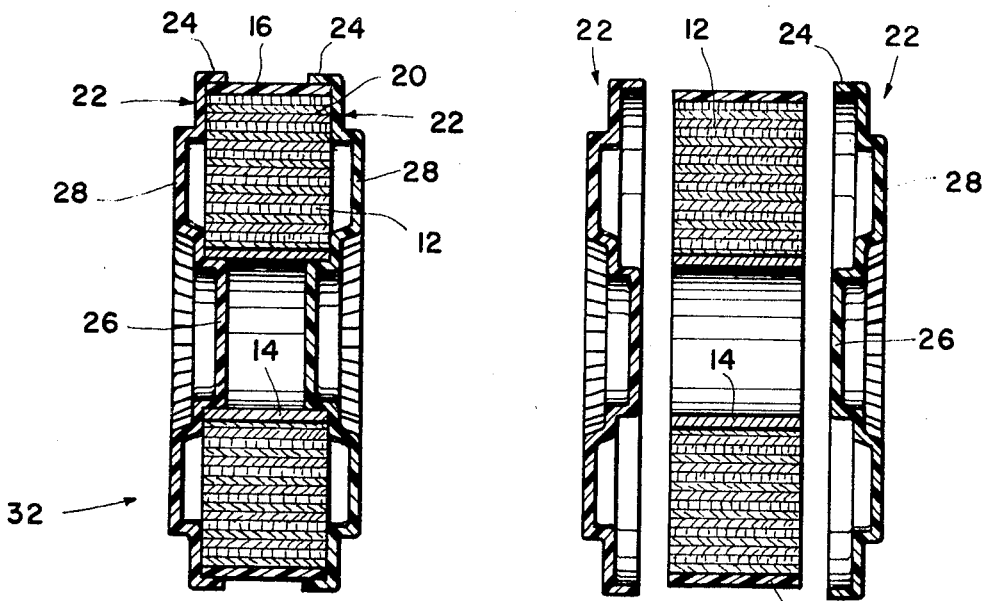
FIG. 3 is an exploded view, in cross section, of a single adhesive laminate and package assembly.
FIG. 4 is a cross sectional view of the completed laminate and package assembly.
Figure 6:
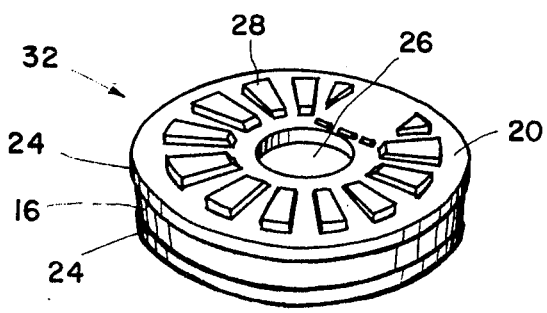
FIG. 6 is a pictorial view of an adhesive laminate package formed according to the teachings of the present invention.

Molded plastic end caps 22 are then positioned on each end or edge of the individual rolls 20. Each end cap has a lip portion 24 which overlies the corresponding edge portion of the circumference of the roll 20. The inner edge of the lip 24 is thus in contact with the outermost layer of the heat sealable material 16. The end caps 22 may be of any desired configuration. One configuration is shown in FIGS. 3 and 4 where the end caps are provided with inwardly projecting center portions 26 which project into the core 14 of the roll 20. The size of the end caps 22 is coordinated with the diameter of the adhesive laminate roll 20 so that the lips 24 are in close fitting engagement with the outer surface of the rolls. The end caps may also be provided with a series of outwardly extending projections 28 arranged in an annular pattern concentric with the roll 20. These projections 28 serve as aligning and interengaging means so that a number of the packaged rolls 20 may be stacked in a compact, stable, and uniformly aligned manner. The rolls 20 obviously can be of any desired length or diameter. Typical lines 18 are indicated in FIG. 2 for cutting the rolls 10 into sections.

As was pointed out above, the lip portions 24 of the end caps 22 are in contact with the outermost layer of the heat sealable material 16 around the entire circumference of the roll 20. Upon the application of heat by suitable means (not shown) along the region of the overlap of the lips 24, the end caps 22 and the heat sealable sheet 16, a seal is formed between the end caps 22 and the heat sealable wrapping 16.

Figure 5:
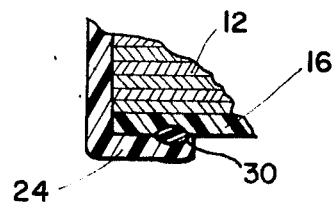
FIG. 5 is a fragmentary cross sectional view showing the relationship between the heat sealable material and the end cap of a completed package formed in accordance with a second embodiment of the invention.

As is shown in FIG. 5, the seal between the wrapping 16 and the lips 24 of the end caps 22 may also be formed by forcing a bead 30 of heated, preferably heat seal plastic between the lips 24 of the end caps 22 and the wrapping 16. Or the bead 30 may be applied to the corner formed by the flange 24 of the end cap and the adjacent surface of the wrapping layer 16. This bead 30 extends circumferentially around the roll 20 to assure an effective seal between the end caps 22 and the wrapping 16. This method of effecting a seal is preferable where the ends 22 and/or the wrapping 16 are formed of relatively thick materials or ones that are difficult to heat seal. Also, this method limits the quantity of heat which must be applied to form an effective seal and thereby lessens the possibility of damaging the adhesive laminate by the application of excessive heat.

The wrapping layer 16 is of the same width as the sheet 12 being packaged.

An improved package and method of packaging has been provided to achieve the objects of the invention.

While only the best known embodiments of the invention have been described and illustrated in detail herein, the invention is not so limited. Reference should therefore be had to the appended claims in determining the true scope of the invention.

What is claimed is:

1. A method of packaging a sheet material which comprises the steps of
    rolling up a sheet of the material to form a cylindrical roll,
    wrapping at least one layer of a heat sealable material in sheet form around the cylindrical surface of the roll,
    positioning preformed plastic caps at each end of the roll, each cap having a lip portion which overlies the edges of the heat sealable material, and
    sealing the end caps to the heat sealable material wrapping by the application of heat.

2. The method according to claim 1 further including the step of cutting the roll and heat sealable material wrapping diametrically to form a plurality of narrower rolls and positioning end caps on each end of each of the narrower rolls prior to sealing the end caps to the heat sealable material.

3. The method according to claim 1 wherein the sheet material is an adhesive laminate and wherein one end of the heat sealable material is secured to the outer end of the adhesive laminate prior to wrapping the heat sealable material around the cylindrical surface.

4. The method according to claim 1 wherein the sealing of the end caps to the heat sealable material is effected by forcing a bead of heated heat sealable material between the end cap and the heat sealable material.

5. The method according to claim 1 wherein the heat sealable material is attached to the trailing edge of the sheet material prior to wrapping the heat sealable material about the roll.

6. A package for a roll of sheet material comprising:
    a heat sealable material wrapping covering the outer cylindrical surface of the roll, and
    a plastic end cap at each end of the roll, each cap having a lip portion which overlies the edge of the heat sealable material wrapping and which is bonded to the wrapping by a heat sealed bond.

7. The package according to claim 6 wherein the sheet material is an adhesive laminate and wherein the heat sealable material is secured to the outer end of the adhesive laminate.

8. The package according to claim 6 wherein the heat sealable material is wrapped around the roll a plurality of times to provide multiple layers of wrapping.

9. The package according to claim 6 further including a bead of plastic material extending circumferentially around the roll and being bonded to both the wrapping and the flange of the end cap.

10. The method according to claim 1 including the step of sealing the end caps to the heat sealable material by beads of heated plastic material deposited to secure the end caps to the heat sealable material.

* * * * *